June 15, 1943.　　　　F. BURDICK　　　　2,321,650
FISHING REEL
Filed May 1, 1941　　　2 Sheets-Sheet 2
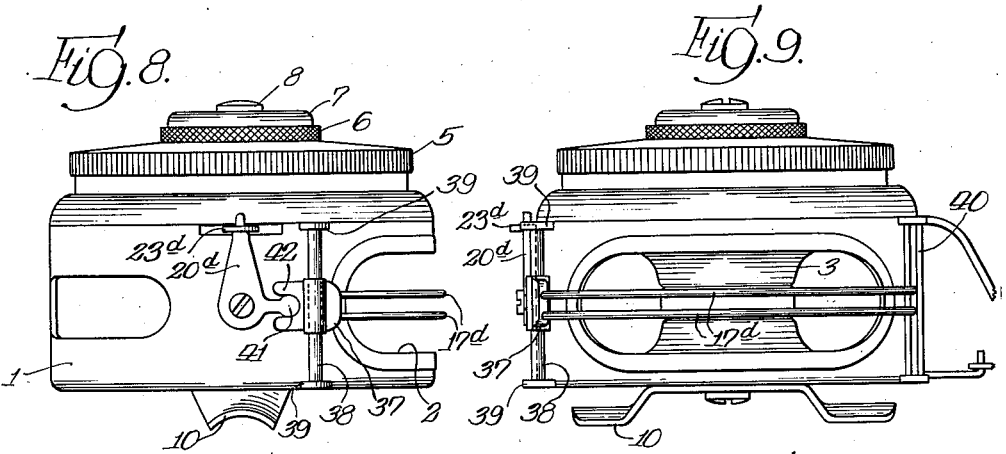
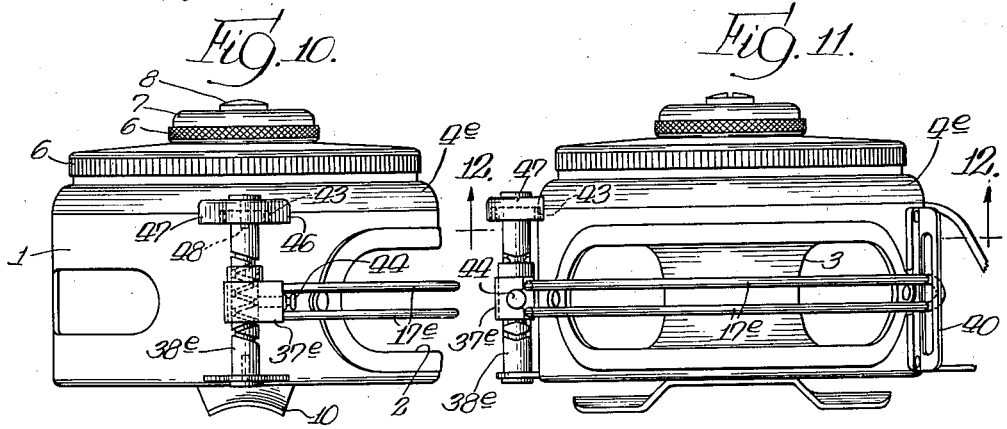
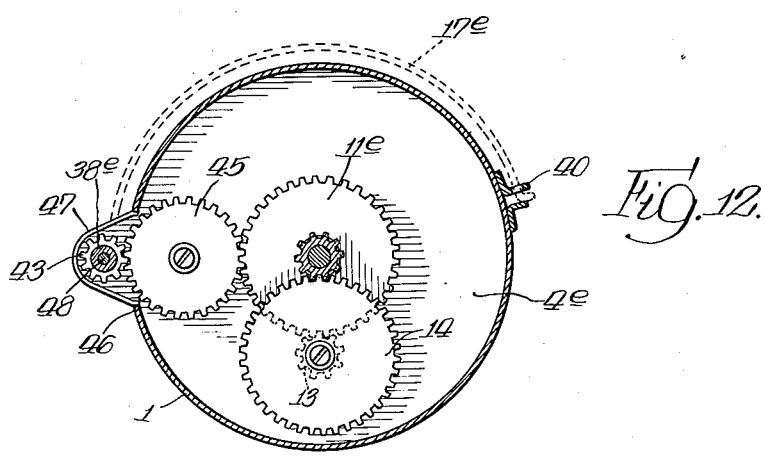
INVENTOR.
Frank Burdick,
BY W. F. Kellogg Atty.

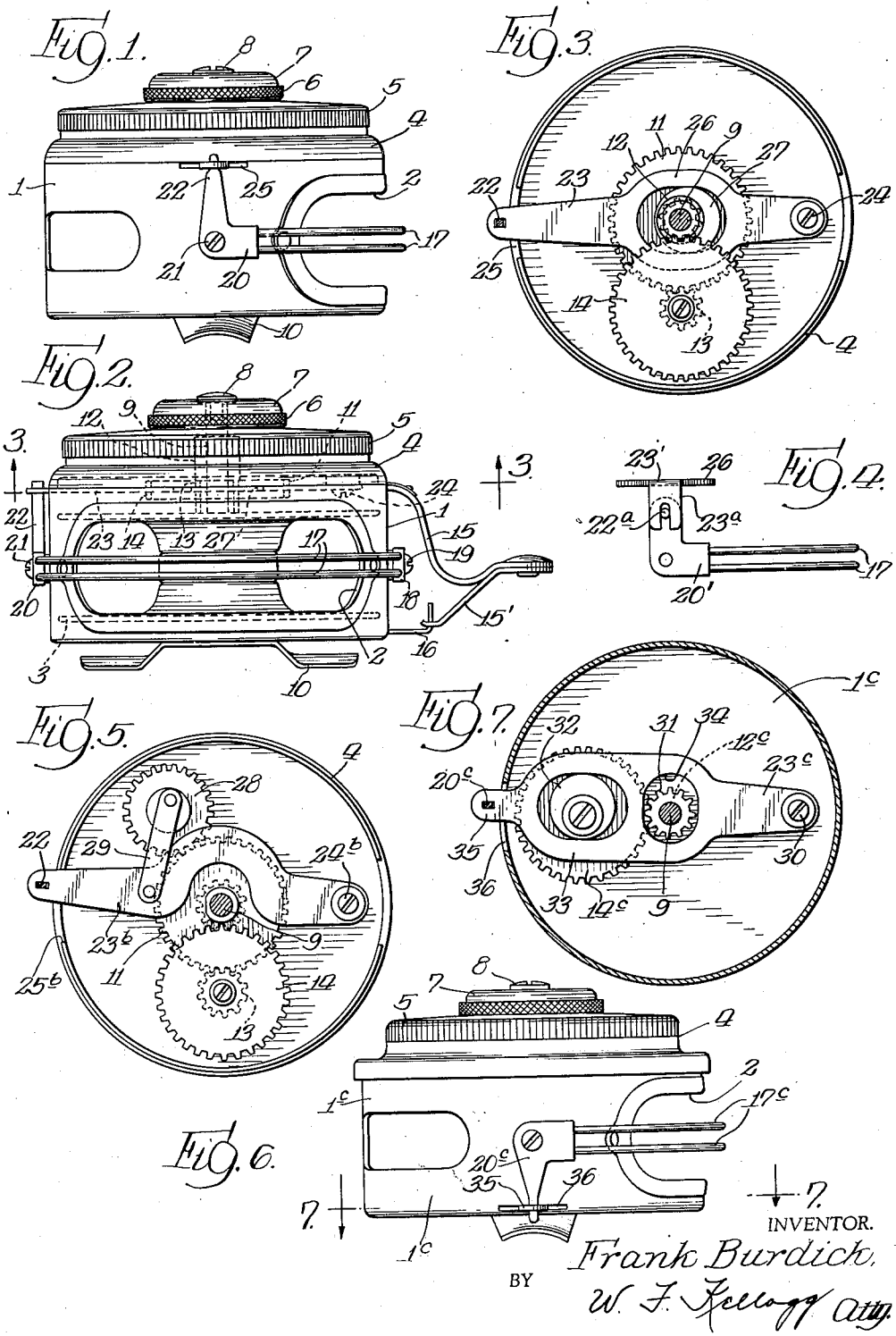

Patented June 15, 1943

2,321,650

UNITED STATES PATENT OFFICE 2,321,650

FISHING REEL

Frank Burdick, Kalamazoo, Mich., assignor to Shakespeare Company, Kalamazoo, Mich., a corporation of Michigan Application May 1, 1941, Serial No. 391,322

6 Claims. (Cl. 242—84.4)

This invention relates to improvements in fishing reels of the automatic line winding type and has for an object to provide a line level winding device for attachment to the so-called "automatic spring winding reels" whereby the utilized line will be automatically, evenly and levelly laid about and along the reel spool barrel during line winding operations of the reel, avoiding its entangling, eliminating spool capacity loss, with the resultant ability of the reel to receive the greatest possible length of line.

An equally important object of the invention is to provide a level winding device of production economical, simple and durable construction, capable of assuring its dependable operation during all periods and characters of operation, notwithstanding a or any particular technic of an angler using the same.

The invention also aims to provide a level wind guide device, which, with attachment, will permit an angler to freely strip line from the reel at any relative angle thereto, peculiar to his personal technic, in contradistinction to the necessity of stripping the line and having it going out through a confined guide eye or the like, thus avoiding various incidental inconveniences as well as damage to the line, i. e., line abrasion, injury to enamel covering of trout line, etc.

A still further object of the invention resides in the provision of a level winding device so constructed and mounted upon an equipped reel as to render difficult, if not impossible, the entangling of line with or about the same and moreover, to avoid injury thereto by contact of foreign objects therewith, as for example, brush or the using angler's wearing apparel and equipment.

Other objects will be in part obvious and in part pointed out hereinafter.

In order that the invention and its mode of operation may be readily understood by those skilled in the art to which it appertains, I have in the accompanying drawings and the detailed description based thereupon, set out several embodiments of my invention.

In these drawings:

Figure 1 is a side elevation of a reel equipped with the invention.

Figure 2 is a like view taken at substantially right angles to Figure 1, illustrating the manner in which the line level winding guide is positioned with respect to the line outlet opening or window.

Figure 3 is a section taken on the line 3—3 of Figure 2, looking in the direction in which the arrows point.

Figure 4 is a detail in elevation illustrating a modified form of connection between the motion transmitting means and the bell crank lever of the line level winding guide.

Figure 5 is a section similar to Figure 3, of a modified form of motion transmitting means for the line level winding guide.

Figure 6 is an elevation of still another modified form of the device showing a slightly modified form of connection between the bell crank lever of the line level winding guide and the motion transmitting lever.

Figure 7 is a section taken on the line 7—7 of Figure 6, looking in the direction in which the arrows point.

Figure 8 is an elevation of still another modified form of the invention wherein a different type of mounting of the line level winding guide and a different type of connection between the same and the bell crank lever are provided.

Figure 9 is a side elevation taken at substantially right angles to Figure 8, having the brake lever assembly fragmentarily shown.

Figure 10 is a side elevation of a still further modified form of the invention wherein the line level winding guide is mounted, at one end, upon a reversely screw-threaded shaft.

Figure 11 is a similar view taken at substantially right angles to Figure 10 illustrating the arrangement of the line level winding guide over the reel line outlet opening and the mounting of its opposite ends; and Figure 12 is a section taken on line 12—12 of Figure 11, looking in the direction in which the arrows point.

Having more particular reference to the drawings, in connection with which like characters of reference will designate corresponding parts throughout, the improved level wind illustrated in Figures 1, 2 and 3, is adapted to an automatic reel of known design, generally comprising a frame assembly 1, provided in its peripheral surface with a plurality of openings through the largest of which, designated by the numeral 2, line is passed to and from a spool 3 within the same. A gear plate assembly 4 is received upon one side of the frame assembly 1 and has a drive spring cap 5 rotatably mounted adjacent thereto equipped with the usual ratchet release ring 6 and ratchet coil case 7, all of which are located in shown assembled relation by a staff screw 8 turned into engagement with the adjacent end of the staff 9. The opposite side of the frame assembly 1 fixedly carries a suitable type of cross plate 10 to facilitate mounting of the reel upon a rod (not shown).

In order that rotary motion may be transmitted to the spool 3, a drive gear 11 is rotatably mounted adjacent the normally inner side and central portion of the gear plate assembly 4 upon the adjacent end of a sleeve 12 journaled in said assembly 4; said sleeve being adapted to have rotary motion transmitted thereto from a suitably tensioned coiled drive spring (not shown) housed by the drive spring cap 5. The drive gear 11 meshes with a pinion 13 journaled in the assembly 4 and carrying an intermediate or driven gear 14, which in turn, meshes with the usual spool pinion 15 (shown in dotted lines in Figures 2 and 3) fixed upon an appropriate portion of the staff 9. Hence, with rotation of the drive gear 11 under urge of the previously tensioned drive spring (not shown) through the sleeve 12, pinion 13 and intermediate gear 14 will be rotated and will transmit such motion to the reel spool 3 via said spool pinion. Release of the tensioned coiled drive spring for transmitting rotary motion is manually effected by operation of the usual brake lever 15 pivotally mounted upon the frame assembly 1, having a leg or extension 15' engaging the adjacent end of a suitable brake lever slide 16.

The level wind guide consists of relatively spaced and complemental curved or semicircular wires 17 of suitable gauge, certain of the ends of which have fixed engagement in a retaining arm 18, pivoted, as at 19, to a portion of the periphery of the frame assembly 1 near an end of the opening 2. The level wind guide constituted by the wires 17, and hereinafter referred to as such, has substantially embracing engagement over a portion of the periphery of the frame assembly 1 longitudinally of the opening 2 and the remaining end of the same is secured to one arm of a bell crank lever 20 mounted at 21, upon the frame assembly in proximity to the opposite side or end of said opening 2. The remaining arm of the bell crank lever 20 is preferably reduced or tapered as indicated at 22, hence providing a finger-like extension upon its free end. The described mounting of the level wind guide 17 is such that oscillatory movement of the same across the opening 2 spanned thereby, will be permitted.

Received within the gear plate assembly 4 is a lever 23 pivotally mounted upon an appropriate portion of the same, as at 24. The opposite end of this lever is passed through a way 25 in a peripheral portion of the assembly 4 and extends to a point without the same; said extended end portion being apertured and receiving the finger-like extension of the portion 22 of the bell crank lever 20 therethrough. A collar or yoke 26 is provided in an intermediate portion of the lever 23 and has peripheral engagement with a cam 27 fixedly carried by the drive gear 11. It will be thus understood that with rotation of the drive gear 11 under influence or urge of the coiled drive spring (not shown), oscillation of the lever 23 will be effected and concurrently, rotary driving motion will be transmitted to the reel spool 3. Reciprocation of the extended and free end of the lever 23 by reason of its referred to oscillatory movement will effect oscillation of the bell crank lever 20 connected to one end of the level wind guide 17, causing the latter to be reciprocated over the opening 2 adjacent thereto. Consequently, line engaged with the reel spool 3, upon winding operation of the latter, will be caused to be automatically and evenly laid or coiled about the spool barrel.

In view of the elongated formation of the level wind guide 17, it will be understood that line passing therethrough may be moved along its entire length, hence, permitting an angler to freely strip line from the reel spool at substantially any angle with relation thereto and by the same token, allowing the line to be laid about or wound upon the spool from substantially any angle.

If desired, the connection between the bell crank lever 22 and the free end of the cam actuated lever 23 may be modified. For example, the form of connection shown in Figure 4, may be substituted. In this particular modification, said end of the lever 23' is formed with a right angularly disposed bifurcated portion 23ᵃ adapted to be loosely engaged with a stud or pin 22ᵃ carried on the adjacent end portion of the bell crank lever 20. Such an arrangement will effect transmission of oscillatory motion from the free end of the lever 23', during its operation by the cam 27, to the bell crank lever 20' and hence, to the level wind guide 17.

The mechanical means for oscillating the actuating lever 23, illustrated in Figure 1 may be modified—as for example according to the form of invention disclosed in Figure 5. In this particular form of actuating lever operating mechanism, the same bell crank lever 20 and level wind guide 17 are employed; however, an irregularly formed lever, such as indicated at 23ᵇ, is pivotally mounted at 24ᵇ within the gear plate assembly 4, its opposite end being extended through and beyond the way 25ᵇ formed in an opposite portion of the periphery of said gear plate assembly 4. The lever 23ᵇ is adapted to have oscillatory motion imparted thereto through or from an additional pinion 28, mounted within the gear plate assembly 4 and meshing with the drive gear 11 therein. Said pinion 28 has oscillatory motion transmitting connection with the actuating lever 23ᵇ at a point beyond its pivotal mounting through a crank lever 29. Thus, with rotation of the pinion 28, oscillatory motion will be imparted to the extended and outer end of the actuating lever 23ᵇ by way of the crank lever 29. Such an arrangement, affords definite utility and advantage in that it will confer adjustability in being able to permit varying of the ratio between the reel spool and the oscillatory level wind guide 17 by changing the pinion 28 and its bearing upon the plate assembly 4 with relation to the drive gear 11 to provide more or less teeth; consequently, rendering it possible to change the ratio of spool revolution to oscillation of the lever 23ᵇ and hence, the level wind guide 17. Such changing of the pinion 28 will take care of different sizes of line on the same width of spool. Also, by moving the crank pin of the lever 29 in the pinion 28 away from or towards the center of said pinion, the oscillatory throw or travel of the level wind guide 17 may be changed to effectually perform for different widths of reels.

Further modification of the mechanical means for transmitting oscillatory motion to the actuating lever 23 may be effected, according to the construction illustrated in Figures 6 and 7. Herein, the lever 23ᶜ is mounted in the bottom of the frame 1ᶜ, as indicated in Figure 6 of the accompanying drawings and in the manner shown in Figure 7 of said drawings, as at 30. An auxiliary spool pinion 31 is fixed to the adjacent side of the reel spool and is loosely received upon an adjacent portion of the staff 9—hence is capable of revolving thereabout. An extra pinion 14ᶜ is rotatably mounted on the bottom of the reel frame 1ᶜ and as will be noted upon reference to Figure 7 of the accompanying drawings, meshes with the auxiliary spool pinion 31. This extra pinion 14ᶜ fixedly mounts or carries a cam 32 on one of its sides. The actuating lever 23ᶜ is provided, in its outer portion, with a yoke 33 snugly receiving the cam 32 therein so that the peripheral portion of said cam has bearing upon the adjacent or inner sides thereof, while an intermediate portion of the actuating lever 23ᶜ is formed with an elongated opening 34 receiving the auxiliary spool pinion 31 therein and as will be understood, affording the lever ample clearance, during its oscillatory motion, with respect to the auxiliary spool pinion 31. The thus equipped reel spool, of course, is adapted to be driven from the usual automatic spring winding mechanism carried upon the opposite or top side of the reel frame 1ᶜ. Consequently, with transmission of rotary motion to the equipped spool, the auxiliary pinion 31, carried upon its under side, as above described, will be rotated and will cause rotation of the extra pinion 14ᶜ meshing therewith. With rotation of said extra pinion 14ᶜ, the cam 32 fixedly carried by the same will be rotated within the yoke 33 of the actuating lever 23ᶜ, thereby imparting oscillatory motion to said actuating lever. The outer or free end of the actuating lever 23ᶜ is formed with an apertured extension or finger 35 which engages through a way 36 formed in an appropriate portion of the periphery of the frame 1ᶜ. The reduced end of the now reversely positioned bell crank lever 20ᶜ which pivotally mounts one end of the level wind guide 17ᶜ, is engaged through the aperture of said finger 35. Hence, with oscillation of the actuating lever 23ᶜ, oscillatory motion will be transmitted to the bell crank lever 20ᶜ and thereby, to the pivotally mounted level wind guide 17ᶜ so that the latter will be caused to automatically move back and forth transversely across the reel frame line guide opening 2.

Different arrangements of mountings of the level wind guide upon the frame assembly may be effected for example, the forms of construction illustrated in the Figures 8 and 10.

In Figures 8 and 9, the level wind guide 17ᵈ is mounted for reciprocal movement with respect to an adjacent frame assembly opening instead of being pivotally mounted as in the preceding embodiments. Certain of the ends of the complemental wires constituting said guide 17ᵈ are anchored in a carriage 37 slidably supported on the guide shaft 38 having fixed support transversely of a portion of the frame assembly 1 adjacent one end of said frame opening as at 39. The remaining end of the level wind guide 17ᵈ is loosely and slidably engaged in the slot or guideway of the bracket 40 arranged transversely of and secured to the frame assembly adjacent the opposite end of said line opening. Such mounting of the level wind guide 17ᵈ, obviously, permits of its reciprocal movement with respect to the frame assembly and over said opening in relative parallelism thereto, so that when line is engaged therethrough, it will be caused, upon reciprocation of the level wind guide, to be evenly laid or coiled about the barrel of the reel spool.

To transmit reciprocal motion to the level wind guide 17ᵈ, from the actuating lever 23ᵈ, the bell crank lever 20ᵈ has one of its arms provided with a curved or rounded extremity 41 loosely engaged in the socket or bifurcated fitting 42 attached to one side of the carriage 37. Therefore, with oscillation of the bell crank lever 20ᵈ, reciprocal motion will be conveyed to the carriage 37 slidably mounted on the guide rod 38, causing the level wind guide 17ᵈ to be reciprocated for line laying operation with respect to the frame assembly line opening.

The construction shown in Figures 10, 11 and 12, discloses a form of level wind guide mounting corresponding to that illustrated in the immediately preceding embodiment except that the guide rod 38 is replaced by a reversely screw-threaded shaft 38ᵉ, having a pinion 43 fixedly mounted on that end adjacent the gear plate assembly 4ᵉ. The carriage 37ᵉ, slidably received upon the reversely screw-threaded shaft 38ᵉ, is equipped with a pawl 44, the inner end of which engages into the screw-threads of said shaft 38ᵉ.

The usual drive gear 11ᵉ in the gear plate assembly 4ᵉ meashes with a smaller gear 45 appropriately mounted within said assembly 4ᵉ so that one portion thereof extends through an opening 46 formed in an adjacent peripheral portion of said gear plate assembly. A cap-like extension 47 is carried by the gear plate assembly adjacent the way 46 and is provided with a downwardly disposed bearing pin 48 adapted, upon engagement of the gear plate assembly 4ᵉ with the frame assembly, to be received in an opening formed in the adjacent end of the shaft 38ᵉ. Accordingly, it will be understood that with rotation of the drive gear 11ᵉ, rotary motion will be directed to the shaft 38ᵉ via the gear 45 and pinion 43, consequently, causing the carriage 37ᵉ to traverse the shaft 38ᵉ and effect reciprocation of the level wind guide 17ᵉ over the line opening or window in the frame assembly. Such reciprocal movement of the level wind guide 17ᵉ, collectively with rotation of the equipped reel spool, obviously will effect automatic and even or level laying of line about the spool barrel.

I claim:

1. In combination with an automatic winding fishing reel and its frame, said frame having a line opening formed in its peripheral portion, line level winding means spanning the frame line opening and pivotally mounted upon the frame in proximity to the opposite ends of said opening, and means operable with rotation of the reel spool for imparting motion to said first means.

2. In combination with an automatic winding fishing reel and its frame, the latter having a line opening formed in its peripheral portion, line level winding means spanning the line opening and extending beyond the opposie ends thereof, said level winding means comprising relatively spaced rods, means pivotally mounting the opposite ends of said level winding means upon the peripheral portion of the frame at the opposite ends of said line opening, and means connected to said line level winding means for transmitting oscillatory motion thereto.

3. In combination with an automatic winding fishing reel and its frame, said frame having a line opening formed in its peripheral portion, a line guide shaped to generally conform with a portion of the frame periphery arranged over said line opening and extended beyond its opposite ends, means on portions of the frame periphery pivotally mounting the opposite ends of said line guide, and means connected to said line guide for imparting oscillatory motion to the same.

4. In combination with an automatic fishing reel and its frame, said frame having a line opening formed in its peripheral portion, a line guide shaped to generally conform with the shape of a portion of the frame periphery spanning said line opening and having its opposite ends extended beyond the opposite ends of the line opening and disposed at approximately right angles to the longitudinal axis of the reel, means connected to the opposite ends of said line guide pivotally mounted upon portions of the frame periphery, and other means connected to certain of said last mentioned means for imparting oscillatory motion thereto.

5. In combination with an automatic winding fishing reel including a frame assembly comprising end walls and a side wall extending therebetween, said side wall having a line opening formed therein, line level winding means spanning said opening and having opposite ends movably mounted on portions of the frame assembly side wall in proximity to the opposite ends of said opening, said line level winding means being formed throughout its length to substantially conform with the formation of the frame assembly side wall and arranged in substantially parallelism thereto, and means operable with rotation of the reel spool for imparting motion to said line level winding means.

6. In combination with an automatic fishing reel, including a frame assembly of substantially circular formation comprising end walls and a peripheral portion extending therebetween, said peripheral portion having an elongated opening formed therein, line level winding means curved throughout the length of the same to substantially conform with the curvature of said peripheral portion spanning said elongated opening and having opposite ends movably mounted on portions of said peripheral portion in proximity to the opposite ends of said elongated opening, and means connected to the line level winding means for imparting motion thereto.

FRANK BURDICK.